(12) United States Patent
Genter et al.

(10) Patent No.: US 10,457,535 B2
(45) Date of Patent: Oct. 29, 2019

(54) ROTARY DUMPSTER

(71) Applicant: Roura Material Handling, Inc., Clinton Township, MI (US)

(72) Inventors: Michael David Genter, Clarkston, MI (US); Joseph Anthony Frontera, Macomb Township, MI (US)

(73) Assignee: ROURA MATERIAL HANDLING, INC., Clinton Township, MI (US)

( * ) Notice: Subject to any disclaimer, the term of this patent is extended or adjusted under 35 U.S.C. 154(b) by 352 days.

(21) Appl. No.: 15/351,762

(22) Filed: Nov. 15, 2016

(65) Prior Publication Data

US 2018/0134532 A1    May 17, 2018

(51) Int. Cl.
   *B66F 9/12*    (2006.01)
   *B66F 9/19*    (2006.01)
   *B65G 65/23*   (2006.01)

(52) U.S. Cl.
   CPC .............. *B66F 9/125* (2013.01); *B65G 65/23* (2013.01); *B66F 9/19* (2013.01)

(58) Field of Classification Search
   CPC ............. B65G 65/23; B66F 9/125; B66F 9/19
   See application file for complete search history.

(56) References Cited

U.S. PATENT DOCUMENTS

| | | | |
|---|---|---|---|
| 6,394,736 B1 | 5/2002 | Derby et al. | |
| 6,565,308 B2 | 5/2003 | Derby et al. | |
| 6,769,857 B2 | 8/2004 | Nyhof | |
| 8,113,759 B1* | 2/2012 | Byron | B65G 65/23 414/419 |
| 2008/0142549 A1* | 6/2008 | Kosich | B65B 69/0083 222/160 |
| 2010/0303598 A1* | 12/2010 | Wanek-Pusset | B66F 9/186 414/629 |
| 2011/0243699 A1* | 10/2011 | Kleeberger | B66F 9/07545 414/639 |
| 2013/0092187 A1* | 4/2013 | Lim | B08B 3/00 134/8 |
| 2014/0202590 A1* | 7/2014 | Higgins | B65B 69/00 141/95 |
| 2015/0003946 A1* | 1/2015 | Verbeck | B66F 9/19 414/592 |
| 2015/0023769 A1* | 1/2015 | Oberg | B65G 65/23 414/299 |
| 2015/0086310 A1* | 3/2015 | Genter | B66F 9/19 414/332 |
| 2015/0329337 A1* | 11/2015 | Ziaylek | B65G 7/00 414/622 |

(Continued)

*Primary Examiner* — Saul Rodriguez
*Assistant Examiner* — Ashley K Romano
(74) *Attorney, Agent, or Firm* — Cantor Colburn LLP

(57) ABSTRACT

A rotary dumpster maneuvers a receptacle via a rotary fork lift assembly that includes a pair of forks. The rotary dumpster includes a base, a first sidewall, and first and second fork tubes. The base is constructed and arranged to support the receptacle when in an upright position. The first sidewall projects upward from the base when in the upright position. The first and second fork tubes are engaged to the first sidewall, and are constructed and arranged to respectively receive the pair of forks for generally moving the rotary dumpster between the upright position and a dumping position. The second fork tube is spaced above the first fork tube when in the upright position.

20 Claims, 4 Drawing Sheets

(56) References Cited

U.S. PATENT DOCUMENTS

2016/0340163 A1* 11/2016 Genter ...................... B66F 9/19
2017/0240397 A1*  8/2017 Eaglestone ............... B66F 9/24
2018/0155172 A1*  6/2018 Dellinger .................. B66F 9/19

* cited by examiner

ROTARY DUMPSTER

The subject invention relates to a dumpster, and more particularly, to a rotary dumpster for maneuvering receptacles.

Various industries often utilize receptacles or containers to store any variety of materials that may require dumping at a later point in time. For example, a company may deposit scrape metals in receptacles conveniently located throughout a factory floor. In time, the receptacles must be transported to a dumping location, and once transported must be emptied into, for example, a tractor trailer. To accomplish the receptacle dumping, the receptacle may first be lifted and then tilted to remove the materials from the receptacle.

Ideally, it is desirable to keep the weight and/or cost of the receptacles to a minimum. One example of a low cost receptacle is a Gaylord container or box. Unfortunately, such low cost and/or light weight containers are not conducive toward relocation and or dumping without causing damage to the receptacle and thus limiting reuse.

SUMMARY

In one, non-limiting, exemplary embodiment of the present disclosure, a rotary dumpster maneuvers a receptacle via a rotary fork lift assembly that includes a pair of forks. The rotary dumpster includes a base, a first sidewall, and first and second fork tubes. The base is constructed and arranged to support the receptacle when in an upright position. The first sidewall projects upward from the base when in the upright position. The first and second fork tubes are engaged to the first sidewall, and are constructed and arranged to respectively receive the pair of forks for generally moving the rotary dumpster between the upright position and a dumping position. The second fork tube is spaced above the first fork tube when in the upright position.

In another, non-limiting, embodiment, a rotary dumpster utilizes a rotary fork lift assembly, having a pair of forks between an upright position and a dumping position about an axis. The rotary dumpster includes a base, a first sidewall, opposing second and third sidewalls, and first and second fork tubes. The base is disposed parallel to the axis. The first sidewall projects from the base and is disposed parallel to the axis. The opposing second and third sidewalls project from the base and from the first sidewall. The base, and the first, second, and third sidewalls define an alcove for receipt of the receptacle. The first and second fork tubes are disposed parallel to the axis, are engaged to the first sidewall, and are constructed and arranged to respectively receive the pair of forks for generally moving the rotary dumpster between the upright position and the dumping position. The second fork tube is spaced above the first fork tube when in the upright position.

The above features and advantages and other features and advantages of the disclosure are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
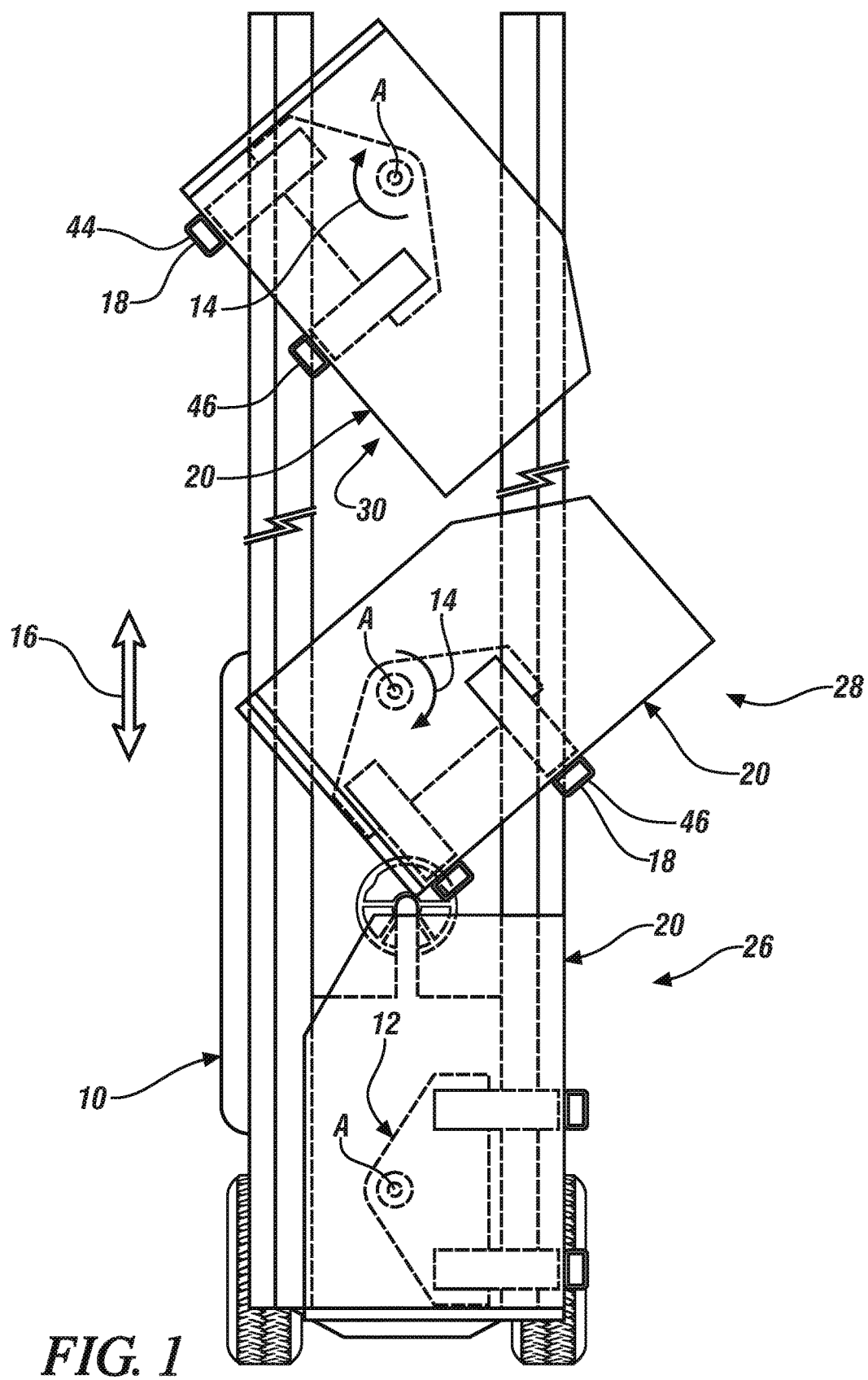
FIG. 1 is a front view of a rotary dumpster being manipulated by a vehicle having a rotary fork lift assembly as one, non-limiting, embodiment in accordance with the present disclosure.

The following description is merely exemplary in nature and is not intended to limit the present disclosure, its application or uses. It should be understood that throughout the drawings, corresponding reference numerals indicate like or corresponding parts and features.

Referring to FIG. 1, a rotary dumpster 20 is illustrated and adapted to be lifted and rotated by an apparatus 10 that may be a transport vehicle. The transport vehicle 10 is operationally coupled to a rotary fork lift assembly 12 that includes a structure 14 constructed and arranged to rotate about an axis A (see arrow 14) that may be substantially horizontal, and move substantially vertically (see arrow 16) with respect to the transport vehicle 10. A plurality of forks 18 (i.e., two illustrated), which may be substantially parallel and spaced laterally from one-another, project outward from the structure 14 for detachable engagement to the rotary dumpster 20. Various examples of the rotary fork lift assembly 12 are generally known by those skilled in the art, therefore further description of the assembly shall not be pursued.

With assistance of the transport vehicle 10 and the rotary fork lift assembly 12, the rotary dumpster 20 facilitates re-positioning between an upright position 26, a mid or lifted position 28, and a dumping position 30. In one example and as illustrated, the transport vehicle 10 may be a fork lift. Other examples of the vehicle 10 may include an aerial lift vehicle, a skidsteer, and other types of vehicles often having a construction or industrial application and capable of attaching and operating the rotary fork lift assembly 12.

Figure 2:
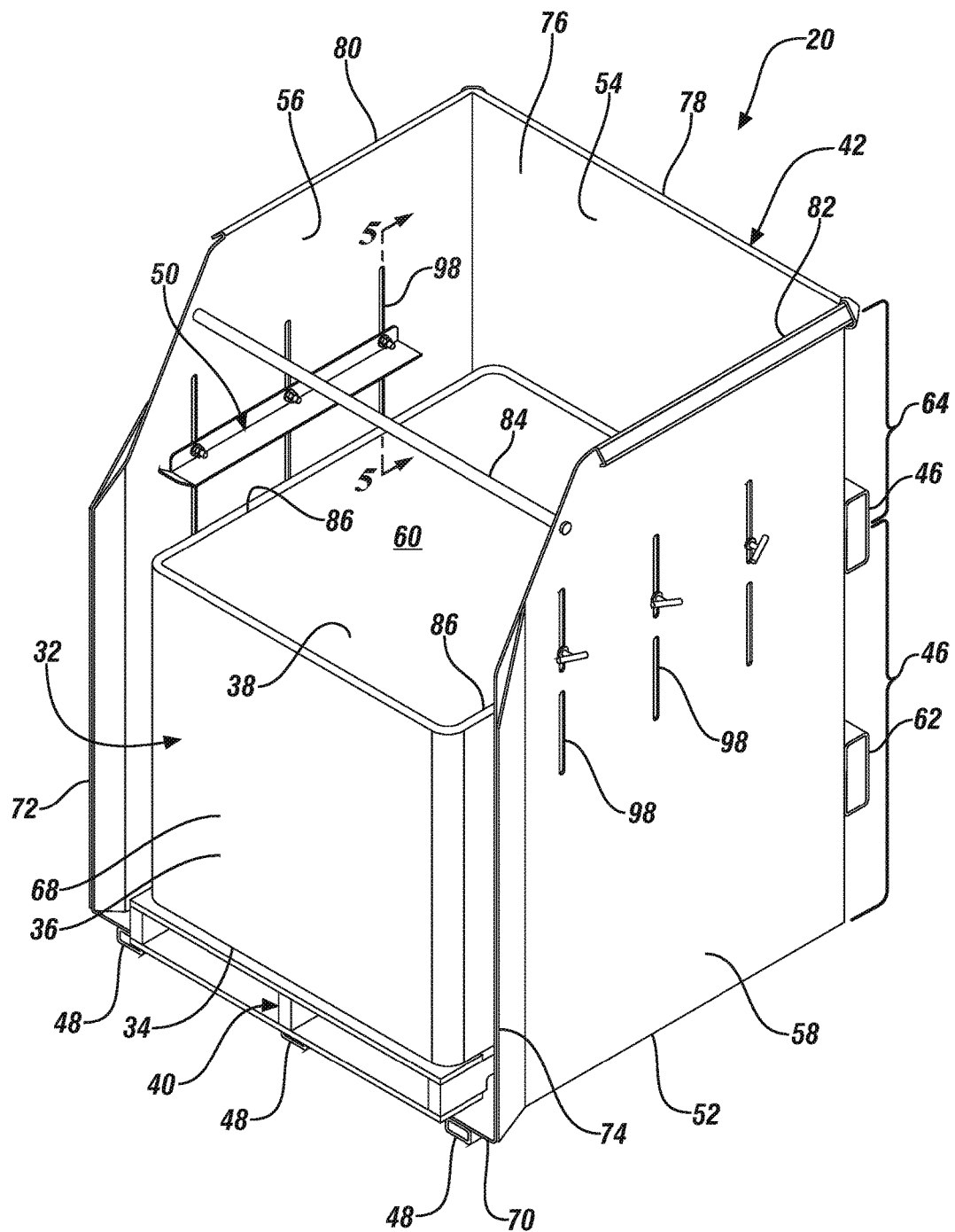
FIG. 2 is a perspective view of the rotary dumpster with a receptacle inside.

Referring to FIG. 2, the rotary dumpster 20 is designed to support a receptacle 32 that may be used to receive, store, and generally transport any kind of material or consignment. Examples of such materials may be materials designated for recycling such as scrap plastics, metals, and others. The receptacle 32 may be any type of receptacle that may have a bottom 34, surrounding sides 36, and an open top (i.e., upward opening 38), through which the materials are received.

In one embodiment, the receptacle 32 may be a Gaylord container or box that may have sufficient strength to hold bulk materials, but generally may not have sufficient strength to be manipulated into various positions or orientations without causing damage to the receptacle and/or spillage of the stored material. One example of a susceptible receptacle position may be a position suitable for emptying the receptacle 32 (i.e., dumping position 30) through the receptacle opening 38. For cost and/or reduced weight considerations, the receptacle 32 may be made of corrugated cardboard, a relatively thin-walled plastic or other material that offers cost and weight benefits but may have limited strength to withstand maneuvering. In one application, the receptacle 32 may be positioned upon a crate 40 that enables the receptacle to be easily lifted vertically and transported to other locations by, for example, a fork lift 10. One such location may be into the rotary dumpster 20, that may have greater structural rigidity than the receptacle 32.

For simplicity of explanation, the rotary dumpster 20 will now be described using terms such as horizontal, vertical, upper, and lower, all with reference to the rotary dumpster 20 being in the upright position 26. The rotary dumpster 20 is structural and made of a material (e.g., steel) having sufficient strength to support and maneuver the receptacle 32 into positions that may not otherwise be easily obtainable (e.g., dumping position 30). The rotary dumpster 20 may be sized to receive both the crate 40 and the receptacle 32 through an open side, and the stored bulk material may be emptied from the receptacle 32 through an open top of the rotary dumpster 20 (i.e., from the perspective of the upright position 26) when in the dumping position 30.

Figure 4:
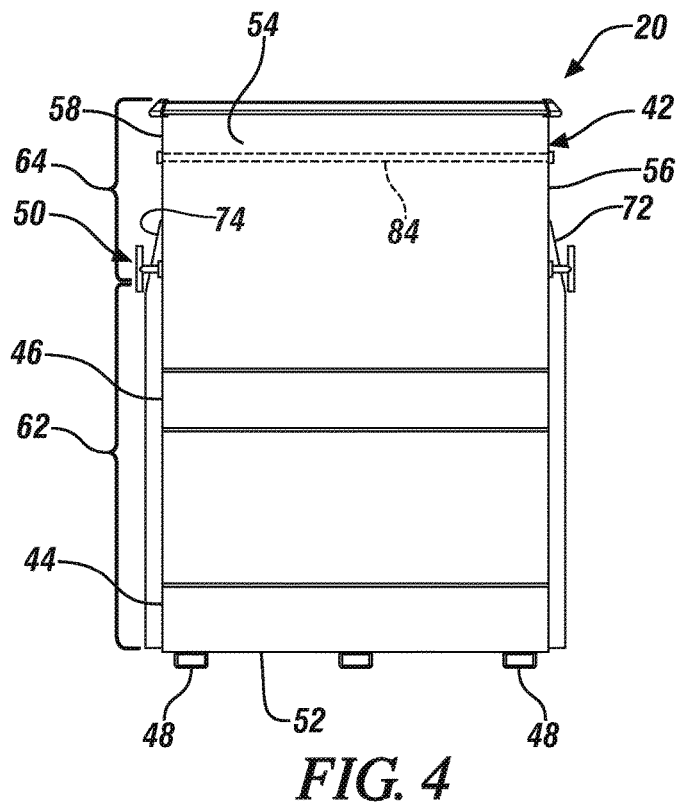
FIG. 4 is a rear view of the rotary dumpster.

The rotary dumpster 20 may include an enclosure 42, a first fork tube 44, a second fork tube 46 (also see FIG. 4), a plurality of stanchions or feet 48 (i.e., three illustrated), and at least one stop device 50 (i.e., two illustrated). The enclosure 42 may include a base 52 and three sidewalls 54, 56, 58 that, together, generally define the boundaries of an alcove 60. The alcove 60 is sized to receive the receptacle 32, and may be sized to further receive the crate 40 with the receptacle. In one embodiment, the base 52 and lower portions of the sidewalls 54, 56, 58 may form a lower containment segment 62 of the enclosure 42 that generally contains the receptacle 32; and, upper, distal, portions of the sidewalls 54, 56, 58 may form a chute segment 64 of the enclosure 42 generally used to guide the stored materials out of the receptacle 32 when the rotary dumpster 20, with the receptacle, is in the dumping position 30. The stop device(s) 50 may generally be located between the lower and upper containment segments 62, 64.

The base 52 of the enclosure 42 may be substantially planar and horizontal. The sidewalls 54, 56, 58 may be substantially planar, are engaged to the base 52, and project vertically upward from the base. The first sidewall 54 is engaged to, and spans between, the second and third sidewalls 56, 58. The sidewalls 56, 58 may be disposed substantially normal to the first sidewall 54, and are spaced from one another by a distance (see arrow 66 in FIG. 3). The receptacle 32 includes a width (see arrow 67) that is less than the distance 66 measured between the sidewalls 56, 58. It is contemplated and understood that in some applications, a lack of receptacle structural rigidity, may cause the sides of the receptacle 32 to slightly bow outward. For this scenario, the spacing between the sidewalls 56, 58 and the respective sides of the receptacle provide a degree of tolerance that facilitates insertion of a potentially filled receptacle 32 into the alcove 60.

The alcove 60 receives the receptacle 32 through a side opening 68 in the enclosure 42. The opening 68 may have boundaries generally defined by a distal edge portion 70 of the base 52, a distal edge portion 72 of the second sidewall 56, and a distal edge portion 74 of the third sidewall 58. The base edge portion 70 may be substantially horizontal and may span between the sidewall edge portions 72, 74 that may be substantially vertical. The sidewall edge portions 72, 74 may generally flare outward to assist an operator of the transport vehicle 10 in guiding the receptacle 32 through the opening 68 and into the alcove 60.

The alcove 60 may be in fluid communication with a top or upper opening 76 in the enclosure 42. The upper opening 76 may have boundaries generally defined by a distal edge segments 78, 80, 82 of the respective first, second and third sidewalls 54, 56, 58. The distal edge segments 78, 80, 82 may each lie within a substantially horizontal plane with the distal edge segment 78 being substantially normal to, and spanning between, the distal edge segments 80, 82. When the rotary dumpster 20 is in the dumping position 30, materials stored in the receptacle 32 are dumped out of the receptacle and out of the enclosure 42 through the opening 76.

The rotary dumpster 20 may further include an elongated member 84 adapted to stiffen the sidewalls 56, 58. The member 84 may span between, and is engaged to, the opposing sidewalls 56, 58. A first end of the elongated member 84 may be generally proximate to, and located between, the distal edge portion 72 and the distal edge segment 80 of the second sidewall 56. An opposite second end of the elongated member 84 may be generally proximate to, and located between, the distal edge portion 74 and the distal edge segment 82 of the third sidewall 58. The opening 68 may generally be located below the member 84, and the opening 76 may be generally located above, or may be defined in part by, the member.

A stop device 50 may be mounted on, and projects inward from, each of the sidewalls 56, 58 for catching a top perimeter or rim 86 (see FIG. 2) of the receptacle 32 when the rotary dumpster 20 is in the dumping position 30. Each stop device 50 may be vertically spaced from the base 52 of the enclosure 42 by a distance (see arrow 88 in FIG. 3) that is greater than a height or distance (see arrow 90) of the receptacle 32 plus the height of the crate 40 is used. The difference between the distances 88, 90 represents a vertical spacing or clearance (see arrow 92) between the stop 50 and the rim 86 of the receptacle 32. Clearance 92 may be large enough to enable relatively easy insertion of the receptacle 32 through the opening 68 and into the alcove 60; however, is small enough to minimize movement of the receptacle 32 while the rotary dumpster moves from the mid position 28 and into the dumping position 30. By minimizing excessive movement of the receptacle 32 with respect to the rotary dumpster 20 while dumping, wear and/or damage to the receptacle 32 may be prevented or minimized.

Figure 5:
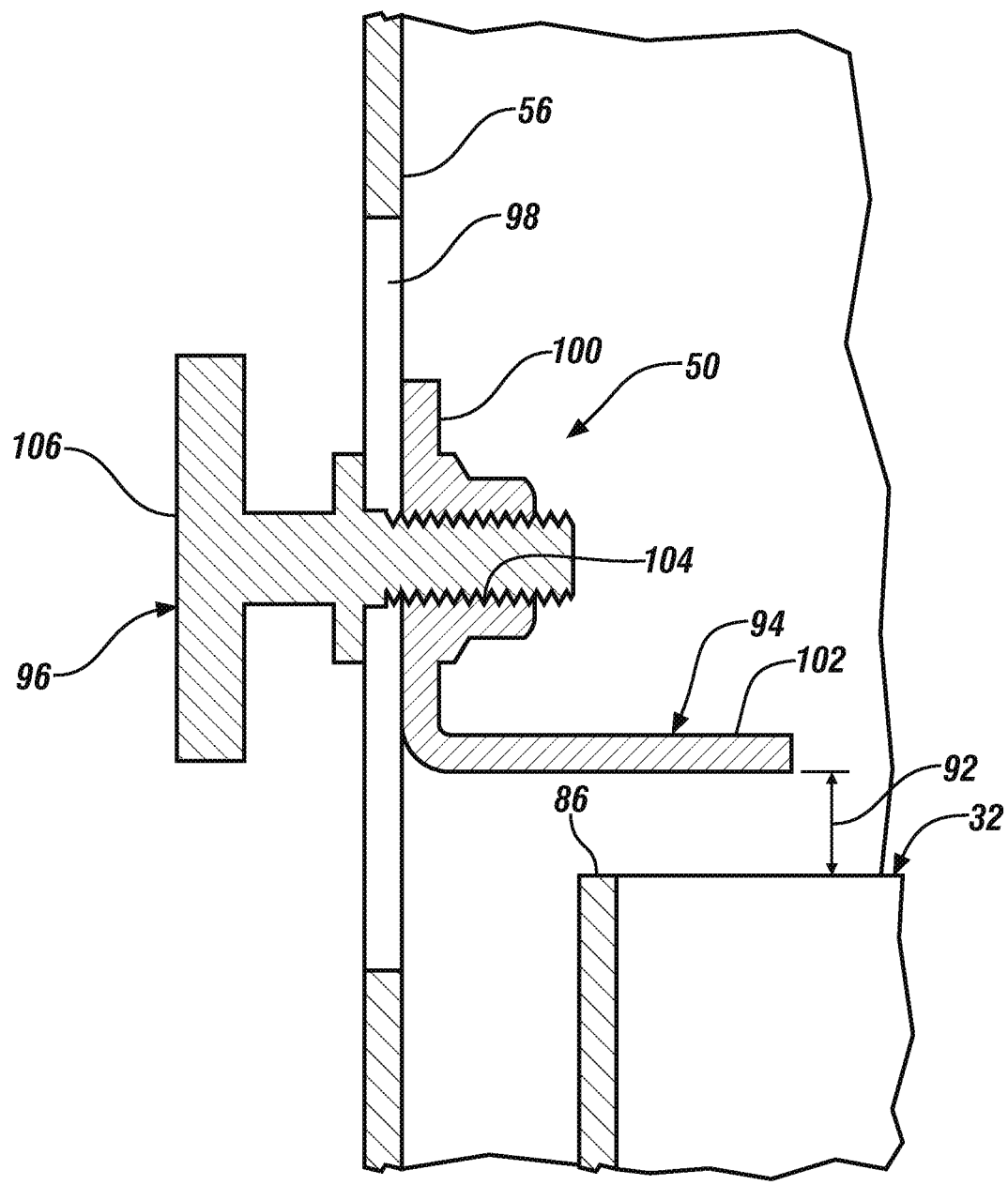
FIG. 5 is a cross section of a stop device viewing in the direction of arrows 5-5 in FIG. 2.

Referring to FIGS. 2 and 5, each stop device 50 may be adjustable to vary the distance 88 and clearance 92. To facilitate this adjustment, each device 50 may include a stop 94, at least one threaded fastener 96 (e.g., bolt, lug, or others), and at least one, substantially vertical, slot 98 communicating through the respective sidewalls 56, 58. The stop 94 may be elongated and may include a cross-section that is generally L-shaped. The stop 94 may include a base section 100 and a projecting section 102. The base section 100 is adapted to slide vertically along the respective sidewalls 56, 58 and the projecting section 102 projects outward from the base section 100 and may project over the rim 86 of the receptacle 32. The base section 100 may include a plurality of spaced, threaded, holes 104 (i.e., three illustrated) each communicating with a respective, laterally spaced apart, slot 98. The threaded fasteners 96 (i.e., three illustrated) are adapted to project through the respective slots 98 and thread into the respective holes 104. Each threaded fastener 96 may include an enlarged head 106 for tightening and loosening of the fastener, thus engaging and disengaging the base sections 100 from the respective sidewalls 56, 58. It is contemplated and understood that the stop device 50 may be mounted on just one, two, or all three sidewalls. It is further contemplated and understood, that each slot 98 may be a plurality of slots vertically spaced from one-another, thus enabling adjustment for a wider range of receptacles 32 with different heights 90 while maintaining or optimizing structural rigidity of the associated sidewalls 56, 58.

Figure 3:
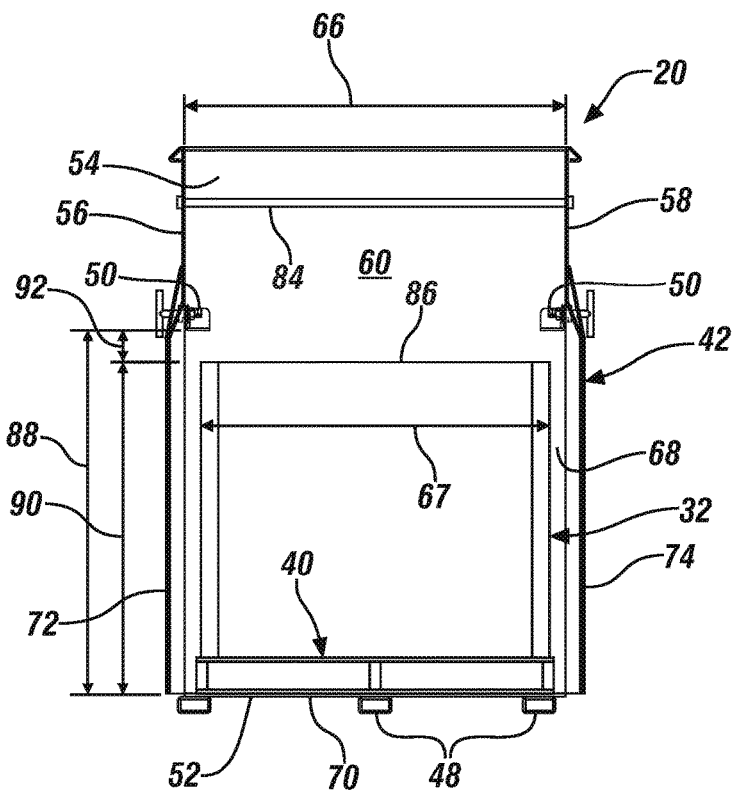
FIG. 3 is a front view of the rotary dumpster.

Referring to FIGS. 1 through 3, each fork tube 44, 46 may extend substantially horizontally, are substantially parallel to rotating axis A, and are engaged to the sidewall 54 generally at the lower containment segment 62. Each tube 44, 46 may be sized to closely encompass and receive the respective forks 18. By surrounding each fork 18, the tubes 44, 46 enhance stability, and thus safety, when the rotary dumpster 20 is being maneuvered (i.e., lifted and rotated). To further enhance stability, the first fork tube 44 may be proximate to the base 52 and the second fork tube 46 is spaced vertically above the first fork tube 44 when the rotary dumpster 20 is in the upright position 26. The second fork tube 46 may be proximate to the elevation of the stops 50, and/or generally located at the intersection of the lower containment segment 62 and the upper chute segment 64. It is contemplated and understood that the tubes 44, 46 may each be a tubular structure engaged (e.g., via welding) to the sidewall 54. Alternatively, the tubes 44, 46 may be formed from a channel structure, or angle structures, engaged to the sidewall 54, where the sidewall itself forms a portion of the tubes 44, 46.

Like the fork tubes 44, 46, the feet 48 may be tubes that generally raise the base 52 of the enclosure 42 off of a floor or ground elevation. The feet 48 may have a sufficient height to permit the insertion of the forks 18 below the base 52 to lift and transport the rotary dumpster 20 to other locations. However, and as another safety enhancement, the width of the feet 48 (i.e., relative to the example of tubes) may be less than a width of the forks 18, thus preventing insertion of the forks into the feet. In this way, the rotary dumpster 20 may not be rotated when the forks 18 are in contact with the base 52, and may only be rotated when the forks are in contact with the sidewall 54.

Referring to FIGS. 1 and 2, and when utilizing the rotary dumpster 20, the same rotary fork lift assembly 12 and transport vehicle 10, capable of placing the receptacle 32 into the rotary dumpster and relocating the rotary dumpster to different locations, may be used to dump the materials from the receptacle 32 and the rotary dumpster 20. For example, after relocation of the rotary dumpster 20, the forks 18 may be removed from under the base 52 of the enclosure 42. The rotary fork lift assembly 12 may then be rotated about ninety degrees (90°) about axis A. Once the forks 18 are positioned such that they may lie within a substantially horizontal plane, the forks 18 may be inserted into the fork tube 44, 46.

When inserted, the rotational axis A of the rotary fork lift assembly 12 may generally traverse or intersect the sidewall 54, and may extend, and is substantially centered, between the sidewalls 56, 58. More specifically, the center of gravity of the transport vehicle 10 may substantially align with a center of gravity of the rotary dumpster 20. This center of gravity alignment generally remains aligned as the rotary dumpster is moved between positions 26, 28, 30. To further facilitate alignment with the center of gravity, the fork tubes 44, 46 are engaged to the sidewall 54 such that the rotational axis A is substantially, vertically, centered between the tubes when the rotary dumpster 20 is in the upright position 26.

With the forks 18 in the fork tubes 44, 46, the vehicle 10 may be adapted to lift the rotary dumpster 20 with the receptacle 32 vertically upward. As the rotary dumpster 20 is lifted upward, or afterwards, the rotary fork lift assembly 12 may begin to rotate the dumpster about axis A, through the mid position 28 and into the dumping position 30. Once in the dumping position 30, the rim 86 of the receptacle 32 may bear upon the pre-adjusted stop devices 50, and the contents or material in the receptacle 32 are dumped out through the opening 76 of the enclosure 42. With the receptacle 32 emptied, this process may be reversed, and the receptacle 32 may then be available for reuse.

Advantages and benefits of the present disclosure may include the ability to utilize relatively inexpensive and light weight receptacles, and an improved and repeated ability to transport and empty the receptacles safely, conveniently and without damage.

While the disclosure is described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A rotary dumpster for maneuvering a receptacle via a rotary fork lift assembly that includes a pair of forks, the rotary dumpster comprising:
    a base constructed and arranged to support the receptacle when in an upright position;
    a first sidewall projecting upward from the base when in the upright position; and
    first and second fork tubes located on the first sidewall and constructed and arranged to respectively receive the pair of forks for generally moving the rotary dumpster between the upright position and a dumping position, wherein the second fork tube is spaced above the first fork tube when in the upright position, and each of the first and second fork tubes extend longitudinally along the first sidewall.

2. The rotary dumpster set forth in claim 1, wherein the first and second fork tubes are substantially horizontal and the second fork tube is spaced above the first fork tube when in the upright position.

3. The rotary dumpster set forth in claim 2, wherein the first fork tube is proximate to the base.

4. The rotary dumpster set forth in claim 3 further comprising:
    a lower containment segment formed by at least a part of the first sidewall and extending vertically from the base; and
    a chute segment formed by at least another part of the first sidewall and projecting upward from the lower containment segment and generally disposed above the receptacle.

5. The rotary dumpster set forth in claim 4, wherein the second fork tube is at least in-part engaged to the lower containment segment and proximate to the chute segment.

6. The rotary dumpster set forth in claim 1, wherein the rotary dumpster is constructed and arranged to rotate about an axis when moving between the upright position and the dumping position, and the first sidewall is generally parallel to the axis.

7. The rotary dumpster set forth in claim 6 further comprising:
    a second sidewall projecting upward from the base when in the upright position and engaged to the first sidewall; and
    a third sidewall projecting upward from the base when in the upright position, engaged to the first sidewall, and spaced from the second sidewall.

8. The rotary dumpster set forth in claim 7, wherein the second sidewall is spaced from the third sidewall by a first distance that is greater than a width of the receptacle.

9. The rotary dumpster set forth in claim 7, wherein the base, the first sidewall, the second sidewall, and the third sidewall define an alcove that is larger than the receptacle.

10. The rotary dumpster set forth in claim 7 further comprising:
an elongated stiffening member extending between and engaged to the second and third sidewalls.

11. The rotary dumpster set forth in claim 1 further comprising:
a plurality of feet engaged to and projecting downward from the base.

12. The rotary dumpster set forth in claim 1, wherein the receptacle is a Gaylord box.

13. The rotary dumpster set forth in claim 1, wherein the rotary dumpster is made of steel having a structural rigidity greater than a structural rigidity of the receptacle.

14. A rotary dumpster for maneuvering a receptacle via a rotary fork lift assembly that includes a pair of forks, the rotary dumpster comprising:
a base constructed and arranged to support the receptacle when in an upright position;
a first sidewall projecting upward from the base when in the upright position;
first and second fork tubes engaged to the first sidewall and constructed and arranged to respectively receive the pair of forks for generally moving the rotary dumpster between the upright position and a dumping position, wherein the second fork tube is spaced above the first fork tube when in the upright position, wherein the rotary dumpster is constructed and arranged to rotate about an axis when moving between the upright position and the dumping position, and the first sidewall is generally parallel to the axis;
a second sidewall projecting upward from the base when in the upright position and engaged to the first sidewall;
a third sidewall projecting upward from the base when in the upright position, engaged to the first sidewall, and spaced from the second sidewall; and
at least one stop device engaged to and projecting inward from at least one of the first, second and third sidewalls, wherein the stop device is spaced from the base by a second distance that is greater than a height of the receptacle and is constructed and arranged to contact a rim of the receptacle when in the dumping position.

15. The rotary dumpster set forth in claim 14, wherein the at least one stop device includes a first stop device engaged to the second sidewall and a second stop device engaged to the third sidewall.

16. The rotary dumpster set forth in claim 14, wherein the first stop device includes a threaded fastener projecting through a slot in the second sidewall, and a stop projecting inward from the second sidewall and threadably engaged to the fastener.

17. The rotary dumpster set forth in claim 16, wherein the slot is substantially vertical and the stop projects substantially horizontal when in the upright position.

18. A rotary dumpster for maneuvering a receptacle via a rotary fork lift assembly, which includes a pair of forks, between an upright position and a dumping position about an axis, the rotary dumpster comprising:
a planar base disposed parallel to the axis;
a first sidewall projecting from the base and disposed parallel to the axis;
opposing second and third sidewalls projecting from the base and the first sidewall, wherein the base and the first, second, and third sidewalls define an alcove for receipt of the receptacle; and
first and second fork tubes disposed parallel to the axis, located on the first sidewall, and constructed and arranged to respectively receive the pair of forks for generally moving the rotary dumpster between the upright position and the dumping position, wherein the second fork tube is spaced above the first fork tube when in the upright position, and each of the first and second fork tubes extend longitudinally along the first sidewall.

19. The rotary dumpster set forth in claim 18, wherein a first distal edge segment of the first sidewall spans between second and third distal edge segments of the respective second and third sidewalls, and the first, second, and third distal edge segments are substantially horizontal when in the upright position and define an opening for dumping of the receptacle.

20. The rotary dumpster set forth in claim 19, wherein a first distal edge portion of the base spans between second and third distal edge portions of the respective second and third sidewalls, and wherein the first distal edge portion is substantially horizontal, the second and third distal edge portions are substantially vertical when in the upright position and the first, second and third distal edge portions define an opening for receipt of the receptacle into the alcove.

* * * * *